(12) United States Patent
Mathew et al.

(10) Patent No.: US 7,929,240 B2
(45) Date of Patent: Apr. 19, 2011

(54) SYSTEMS AND METHODS FOR ADAPTIVE MRA COMPENSATION

(75) Inventors: George Mathew, San Jose, CA (US); Yuan Xing Lee, San Jose, CA (US); Harley Burger, San Jose, CA (US); Li Du, Broomfield, CO (US)

(73) Assignee: LSI Corporation, Milpitas, CA (US)

( * ) Notice: Subject to any disclaimer, the term of this patent is extended or adjusted under 35 U.S.C. 154(b) by 165 days.

(21) Appl. No.: 12/337,775

(22) Filed: Dec. 18, 2008

(65) Prior Publication Data
US 2010/0157464 A1    Jun. 24, 2010

(51) Int. Cl.
*G11B 5/03* (2006.01)
*G11B 5/035* (2006.01)
(52) U.S. Cl. .......... 360/66; 360/65; 369/47.17; 375/254
(58) Field of Classification Search .................. None
See application file for complete search history.

(56) References Cited

U.S. PATENT DOCUMENTS

| | | |
|---|---|---|
| 5,262,904 A | 11/1993 | Tang et al. |
| 5,357,520 A | 10/1994 | Arnett et al. |
| 5,493,454 A | 2/1996 | Ziperovich et al. |
| 5,517,146 A | 5/1996 | Yamasaki |
| 5,583,705 A | 12/1996 | Ziperovich et al. |
| 5,781,358 A | 7/1998 | Hasegawa |
| 5,986,830 A | 11/1999 | Hein |
| 5,999,355 A | 12/1999 | Behrens et al. |
| 6,043,942 A | 3/2000 | Cunningham et al. |
| 6,091,560 A | 7/2000 | Du |
| 6,130,794 A | 10/2000 | Christensen |
| 6,134,691 A | 10/2000 | Hirasaka |
| 6,141,168 A | 10/2000 | Takahashi et al. |
| 6,147,828 A * | 11/2000 | Bloodworth et al. ........... 360/65 |
| 6,181,505 B1 | 1/2001 | Sacks et al. |
| 6,208,481 B1 | 3/2001 | Spurbeck et al. |
| 6,212,024 B1 | 4/2001 | Igarashi et al. |
| 6,243,031 B1 | 6/2001 | Jusuf et al. |
| 6,246,723 B1 | 6/2001 | Bliss et al. |
| 6,337,778 B1 | 1/2002 | Gagne |
| 6,396,651 B1 * | 5/2002 | Grover ........................... 360/65 |

(Continued)

FOREIGN PATENT DOCUMENTS
GB    2 230 866    6/1997

OTHER PUBLICATIONS

U.S. Appl. No. 12/199,325, filed Aug. 27, 2008, Mathew.

(Continued)

*Primary Examiner* — Jason C Olson
(74) *Attorney, Agent, or Firm* — Hamilton, DeSanctis & Cha

(57) ABSTRACT

Various embodiments of the present invention provide systems and methods for reducing head distortion. For example, various embodiments of the present invention provide storage devices that include a storage medium, a read/write head assembly, and an adaptive distortion modification circuit. The storage medium includes information that may be sensed by the read/write head assembly that is disposed in relation to the storage medium. The adaptive distortion modification circuit receives the information sensed by the read/write head assembly and adaptively estimates and implements a distortion compensation factor in the analog domain. In some instances of the aforementioned embodiments, the read/write head assembly includes a magneto resistive head. In such instances, the distortion compensation factor is designed to compensate for non-linear distortion introduced by the magneto resistive head.

19 Claims, 7 Drawing Sheets

U.S. PATENT DOCUMENTS

| | | |
|---|---|---|
| 6,404,572 B1 | 6/2002 | Hong |
| 6,535,345 B1 | 3/2003 | Shimoba |
| 6,563,655 B1 | 5/2003 | Yamasaki et al. |
| 6,621,648 B2 | 9/2003 | Elliott et al. |
| 6,662,303 B1 | 12/2003 | Toosky et al. |
| 6,671,244 B2 | 12/2003 | Honma |
| 6,674,590 B2 | 1/2004 | Ottesen et al. |
| 6,678,230 B2 | 1/2004 | Miyashita et al. |
| 6,721,114 B1 | 4/2004 | Sutardja et al. |
| 6,788,481 B2 | 9/2004 | Fang et al. |
| 6,894,854 B1 | 5/2005 | Carlson et al. |
| 6,912,682 B1 | 6/2005 | Aoki |
| 6,934,100 B2 | 8/2005 | Ueno |
| 6,937,415 B2 | 8/2005 | Galbraith et al. |
| 7,012,772 B1 | 3/2006 | Vis |
| 7,079,342 B1 * | 7/2006 | Han et al. ............. 360/46 |
| 7,092,179 B2 | 8/2006 | Yamanouchi |
| 7,092,180 B2 * | 8/2006 | Franck ............. 360/46 |
| 7,123,429 B2 | 10/2006 | Musungu et al. |
| 7,126,773 B1 | 10/2006 | Taratorin |
| 7,193,802 B2 | 3/2007 | Cideciyan et al. |
| 7,248,424 B2 | 7/2007 | Ueno |
| 7,256,954 B2 | 8/2007 | Serizawa |
| 7,262,928 B1 | 8/2007 | Oberg |
| 7,271,753 B1 | 9/2007 | Padukone et al. |
| 7,308,057 B1 | 12/2007 | Patapoutian |
| 7,440,224 B2 | 10/2008 | Ehrlich et al. |
| 7,495,854 B2 | 2/2009 | Hutchins et al. |
| 7,542,227 B2 | 6/2009 | Che et al. |
| 7,715,135 B1 | 5/2010 | Sutardja et al. |
| 7,733,591 B2 | 6/2010 | Bottemiller et al. |
| 2002/0159350 A1 | 10/2002 | Ogura et al. |
| 2003/0048564 A1 | 3/2003 | Koller et al. |
| 2005/0117243 A1 | 6/2005 | Serizawa |
| 2006/0061496 A1 | 3/2006 | Stein et al. |
| 2006/0062125 A1 | 3/2006 | Horie et al. |
| 2006/0176947 A1 | 8/2006 | Lim |
| 2007/0041115 A1 | 2/2007 | Lee |
| 2007/0047120 A1 | 3/2007 | DeGroat |
| 2007/0076313 A1 | 4/2007 | Hutchins et al. |
| 2007/0140088 A1 | 6/2007 | Hino et al. |
| 2008/0031114 A1 | 2/2008 | Hong et al. |
| 2008/0037153 A1 | 2/2008 | Yoshizawa |
| 2009/0161245 A1 | 6/2009 | Mathew et al. |

OTHER PUBLICATIONS

U.S. Appl. No. 12/273,265, filed Nov. 18, 2008, Mathew.
U.S. Appl. No. 12/247,378, filed Oct. 8, 2008, Mathew.
U.S. Appl. No. 12/337,805, filed Dec. 18, 2008, Mueller.
U.S. Appl. No. 12/348,236, filed Jan. 2, 2009, Liu.
U.S. Appl. No. 12/337,850, filed Dec. 18, 2008, Mueller.
U.S. Appl. No. 12/337,828, filed Dec. 18, 2008, Meuller.
PCT/US2008/081381, Publication Date Oct. 27, 2008, Mathew.

* cited by examiner

SYSTEMS AND METHODS FOR ADAPTIVE MRA COMPENSATION

BACKGROUND OF THE INVENTION

The present inventions are related to systems and methods for compensating signals received from a magnetoresistive head, and more particularly to systems and methods for determining the applicable compensation for distortion introduced by a magnetoresistive head.

Some storage devices rely on magnetoresistive read heads to sense information previously written to a magnetic storage medium. Such heads typically exhibit some level of non-linear distortion that causes significant degradation in the performance of a data detection circuit, and in some cases disqualification of magnetoresistive heads where the degradation becomes too large. To avoid this degradation, various approaches have been developed to compensate for the non-linear distortion. Existing approaches are, however, costly in terms of time required to calculate distortion compensation or due to high latency the distortion compensation calculation typically must be performed only at start-up and in reasonably static conditions.

Some existing approaches for distortion compensation rely on post detection data output to determine compensation factors. Turning to FIG. 1, an example of a post detection distortion compensation system 100 is shown. Post detection distortion compensation system 100 includes a magnetoresistive read head 130 that senses magnetic information and provides a corresponding electrical signal to an analog signal conditioning circuit 135. A condition analog signal is provided to a variable gain amplifier 140. The output from variable gain amplifier 140 is provided to an analog squaring function 145 (i.e., a second order function). The result of the second order function is multiplied by a distortion compensation factor 152 using a multiplication circuit 150, and the product of the multiplication is subtracted from the output of variable gain amplifier 140 using a summation element 155.

The result from summation element 155 is provided to a continuous time filter 105, and the filtered output is provided to an analog to digital converter 110. The corresponding series of digital samples derived from analog to digital converter 110 are provided to a digital detection circuit 115 that includes a data detector. Digital detection circuit 115 provides a data output 125, and also provides an error information to an adaptive distortion compensation calculation circuit 120. Using the error information, adaptive distortion compensation calculation circuit 120 provides distortion compensation factor 152. Of note, the distortion compensation factor is not available until a considerable time after the data from which it was derived is received at magnetoresistive head 130. This latency renders such an approach ineffective for real-time computation of distortion compensation factors.

Searching over a grid is the most commonly used approach to determine the amount of asymmetry, and thereby needed compensation. Such an approach is quite time-consuming and also ineffective for real-time computation of distortion compensation factors. Turning to FIG. 2, a flow diagram 200 depicts a method for searching over a grid for distortion compensation factors. Following flow diagram 200, an initial compensation parameter value is selected and set (block 205). A detection process is performed (block 210), and a resulting error rate is determined and stored (block 215). It is determined if another parameter value is to be tested (block 220). Where another parameter is to be tested (block 220), the next parameter value is selected and set (block 207) and the processes of blocks 210-220 re repeated for the next parameter value. Where no parameter values remain to be tested (block 220), the stored error rates are compared (block 225) and the parameter corresponding to the lowest error rate is selected (block 230) as the distortion compensation parameter.

The approach of FIG. 2, similar to that discussed above in relation to FIG. 1, relies on back-end information (e.g., data-decisions) for estimating the distortion compensation. This becomes a problem when there is substantial latency between front-end and back-end. Further, the approaches of both FIG. 1 and FIG. 2 require gain normalization in the signal prior to determining distortion compensation parameters. This limits flexibility, and it becomes a serious problem in system where the front-end and back-end are substantially decoupled. Finally, in AC-coupled channels, MRA compensation reintroduces DC-content in the signal and worsens the baseline wander caused by the AC-coupler.

Hence, for at least the aforementioned reasons, there exists a need in the art for advanced systems and methods for determining fly-height.

BRIEF SUMMARY OF THE INVENTION

The present inventions are related to systems and methods for compensating signals received from a magnetoresistive head, and more particularly to systems and methods for determining the applicable compensation for distortion introduced by a magnetoresistive head.

Various embodiments of the present invention provide storage devices that include a storage medium, a read/write head assembly, and an adaptive distortion modification circuit. The storage medium includes information that may be sensed by the read/write head assembly that is disposed in relation to the storage medium. The adaptive distortion modification circuit receives the information sensed by the read/write head assembly and adaptively estimates and implements a distortion compensation factor in the analog domain. In some instances of the aforementioned embodiments, the read/write head assembly includes a magneto resistive head. In such instances, the distortion compensation factor is designed to compensate for non-linear distortion introduced by the magneto resistive head.

In various instances of the aforementioned embodiments, the distortion compensation factor is an updated distortion compensation factor, and the adaptive distortion modification circuit receives the information sensed by the read/write head assembly as an input analog signal. In such instances, the adaptive distortion modification circuit includes: a previous distortion compensation factor, a distortion reduction circuit, and a distortion compensation circuit. The distortion reduction circuit provides a compensated analog output, and reduces distortion in the input analog signal based upon a second order function of the input analog signal, a third order function of the input analog signal, and the previous distortion compensation factor. The distortion compensation calculation circuit calculates an updated distortion compensation factor based at least in part on the previous distortion compensation factor and the compensated analog output.

In particular instances of the aforementioned embodiments, the second order circuit squares the input analog signal and provides a second order output, and the third order circuit cubes the input analog signal and provides a third order output. In such instances, the distortion reduction circuit further includes a first multiplication circuit, a second multiplication circuit, an aggregation circuit, a high pass filter and a switch. The first multiplication circuit provides a first product that is multiplication of the second order output by the previous distortion compensation factor. The second multiplication circuit provides a second product that is a multiplication of the third order output by a square of the previous distortion compensation factor and a scalar. The aggregation circuit provides an aggregate output that is the first product less the second product. The high pass filter filters the first aggregate output to provide a filtered output. The switch is disposed between the first aggregation circuit and a second aggregation circuit. The second aggregation circuit provides the compensated analog output. When the switch is closed, the compensated analog output is the analog signal less the filtered output. When the switch is opened, the compensated analog output is the analog signal.

In other particular instances of the aforementioned embodiments, the distortion compensation circuit includes a positive envelope tracking circuit, a negative envelope tracking circuit, an aggregation circuit, and a distortion compensation calculation circuit. The positive envelope tracking circuit receives the compensated analog output and calculates a positive envelope, and the negative envelope tracking circuit receives the compensated analog output and calculates a negative envelope. The aggregation circuit provides an aggregate output that is the sum of the positive envelope and the negative envelope. The distortion compensation calculation circuit provides the updated distortion compensation factor. The updated distortion compensation factor is the previous distortion compensation factor plus a derivative of the aggregate output.

Other embodiments of the present invention provide distortion compensation circuits that receive an input analog signal. Such circuits include a previous distortion compensation factor, a distortion reduction circuit, and a distortion compensation calculation circuit. The distortion reduction circuit provides a compensated analog output that reduces distortion in the input analog signal based upon a second order function of the input analog signal, a third order function of the input analog signal, and the previous distortion compensation factor. The distortion compensation calculation circuit calculates an updated distortion compensation factor based at least in part on the previous distortion compensation factor and the compensated analog output.

In some instances of the aforementioned embodiments, the second order circuit squares the input analog signal and provides a second order output, and the third order circuit cubes the input analog signal and provides a third order output. In such instances, the distortion reduction circuit further includes a first multiplication circuit that provides a first product that is a multiplication of the second order output by the previous distortion compensation factor, and a second multiplication circuit that provides a second product that is a multiplication of the third order output by a square of the previous distortion compensation factor and a first scalar. In one or more instances of the aforementioned embodiments, the distortion reduction circuit further includes a first aggregation circuit providing a first aggregate output that is the first product less the second product, a high pass filter that filters the first aggregate output to provide a filtered output, a switch and a second aggregation circuit. The switch is disposed between the first aggregation circuit and a second aggregation circuit. The second aggregation circuit provides the compensated analog output. The compensated analog output is the analog signal less the filter output when the switch is closed and the analog signal when the switch is open.

In one or more instances of the aforementioned embodiments, the distortion compensation calculation circuit includes a positive envelope tracking circuit and a negative envelope tracking circuit. The positive envelope tracking circuit receives the compensated analog output and calculates a positive envelope, and the negative envelope tracking circuit receives the compensated analog output and calculates a negative envelope. An aggregation circuit provides an aggregate output that is the sum of the positive envelope and the negative envelope. A distortion compensation calculation circuit provides the updated distortion compensation factor. The updated distortion compensation factor is the previous distortion compensation factor plus a derivative of the aggregate output.

Yet another embodiment of the present invention provides a distortion compensation circuit that receives an analog signal. In some cases, the analog signal is derived from a magnetic storage medium using a read head that introduces some non-linear distortion. The circuits include a second order circuit that squares the analog signal and provides a second order output, and a third order circuit that cubes the analog signal and provides a third order output. A first multiplication circuit is included that provides a first product that is a multiplication of the second order output by a previous distortion compensation factor. A second multiplication circuit is included that provides a second product that is a multiplication of the third order output by a square of the previous distortion compensation factor and a first scalar. A first aggregation circuit provides a first aggregate output that is the first product less the second product. A high pass filter filters the first aggregate output and provides a filtered output. A switch disposed between the high pass filter and a second aggregation circuit is included. The second aggregation circuit provides a second aggregate output that is the analog signal less the filtered output when the switch is closed and the analog signal when the switch is open. A positive envelope tracking circuit receiving the second aggregate output and calculating a positive tracking envelope, and a negative envelope tracking circuit receiving the second aggregate output and calculating a negative tracking envelope are included. A third aggregation circuit provides a third aggregate output that is the sum of the positive tracking envelope and the negative tracking envelope. A sign circuit provides a sign of the third aggregate output. A third multiplication circuit provides a third product that is a multiplication of the sign of the third aggregate output by a second scalar. A distortion compensation calculation circuit provides an updated distortion compensation factor that is the previous distortion compensation factor plus the third product.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for compensating signals received from a magnetoresistive head, and more particularly to systems and methods for determining the applicable compensation for distortion introduced by a magnetoresistive head.

Various embodiments of the present invention provide circuits and approaches for determining and applying distortion compensation factors in the analog front end without relying on backend data decisions. In some cases, this renders on the fly compensation feasible as the latency of determining updated distortion factors is limited. In one or more embodiments of the present invention, an adaptive estimation of appropriate compensation factors is used. Such an adaptive estimation may be designed to converge relatively quickly when compared with existing grid search approaches. As another of many advantages, some embodiments of the present invention do not require use of a gain adjusted signal input as the approaches are reasonably robust to changes in gain exhibited by the received signal.

Figure 1:
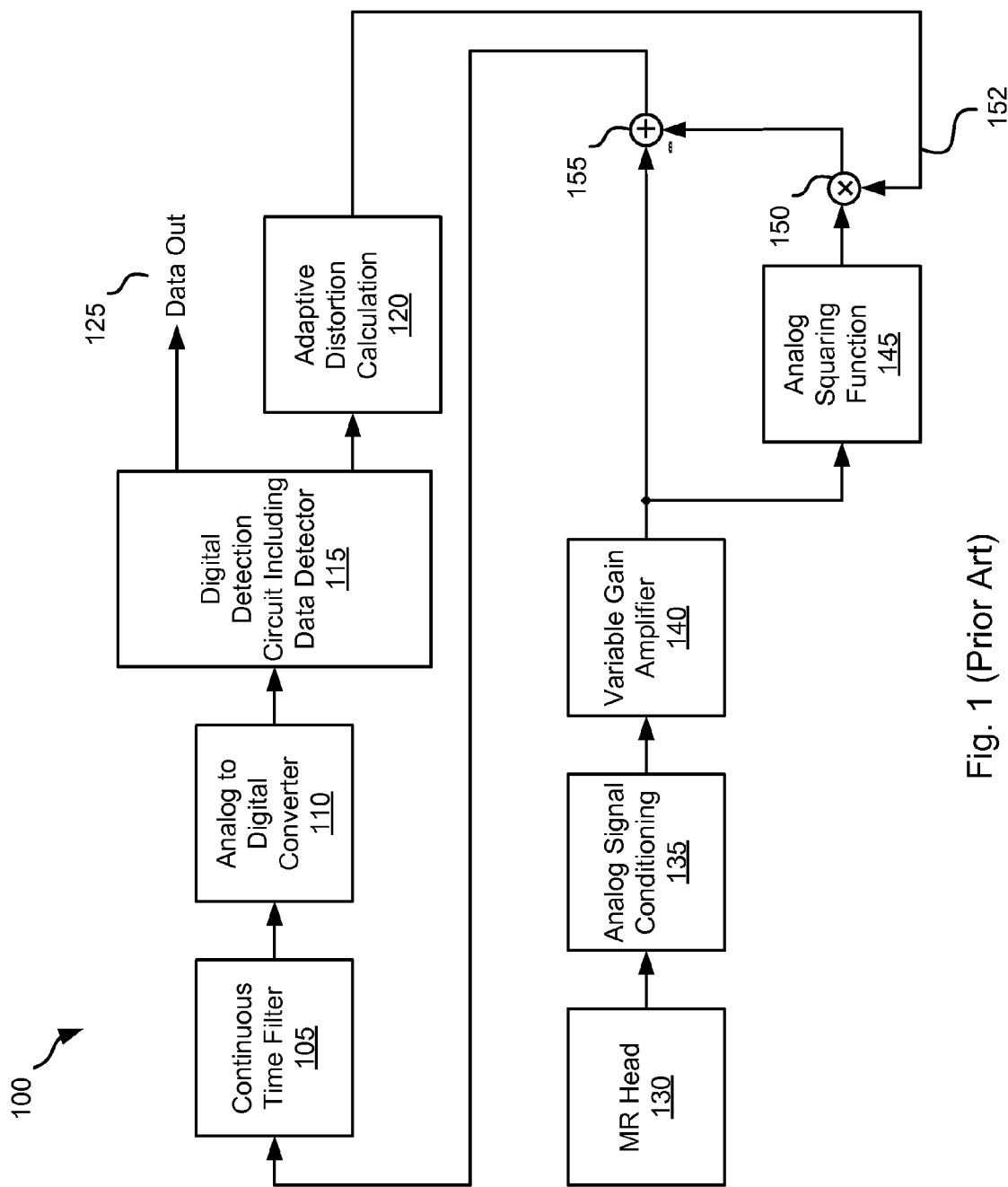
FIG. 1 depicts a prior art distortion compensation system relying on back end information.
Figure 2:
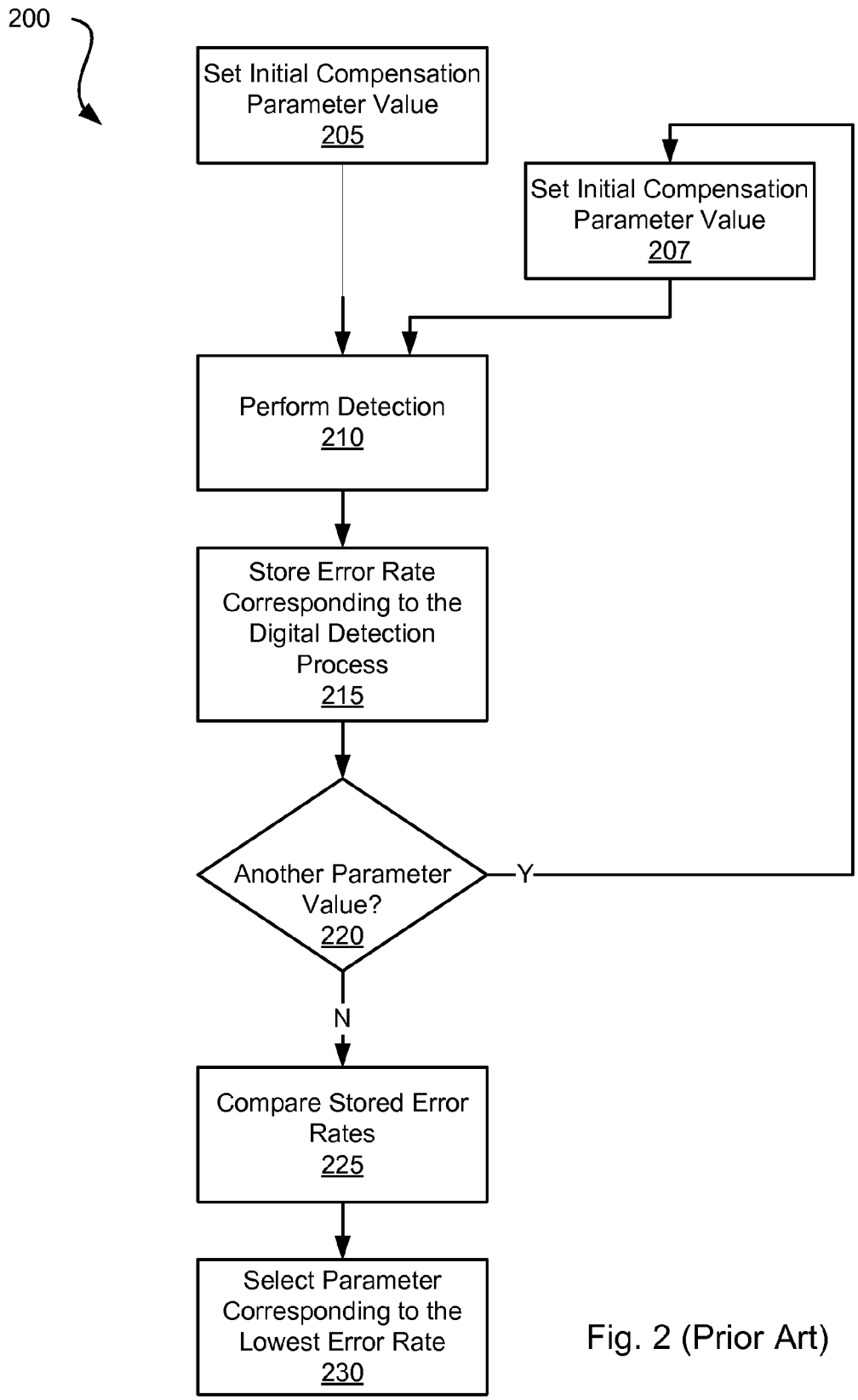
FIG. 2 depicts a prior art grid search based method for determining distortion compensation factors.
Figure 3:
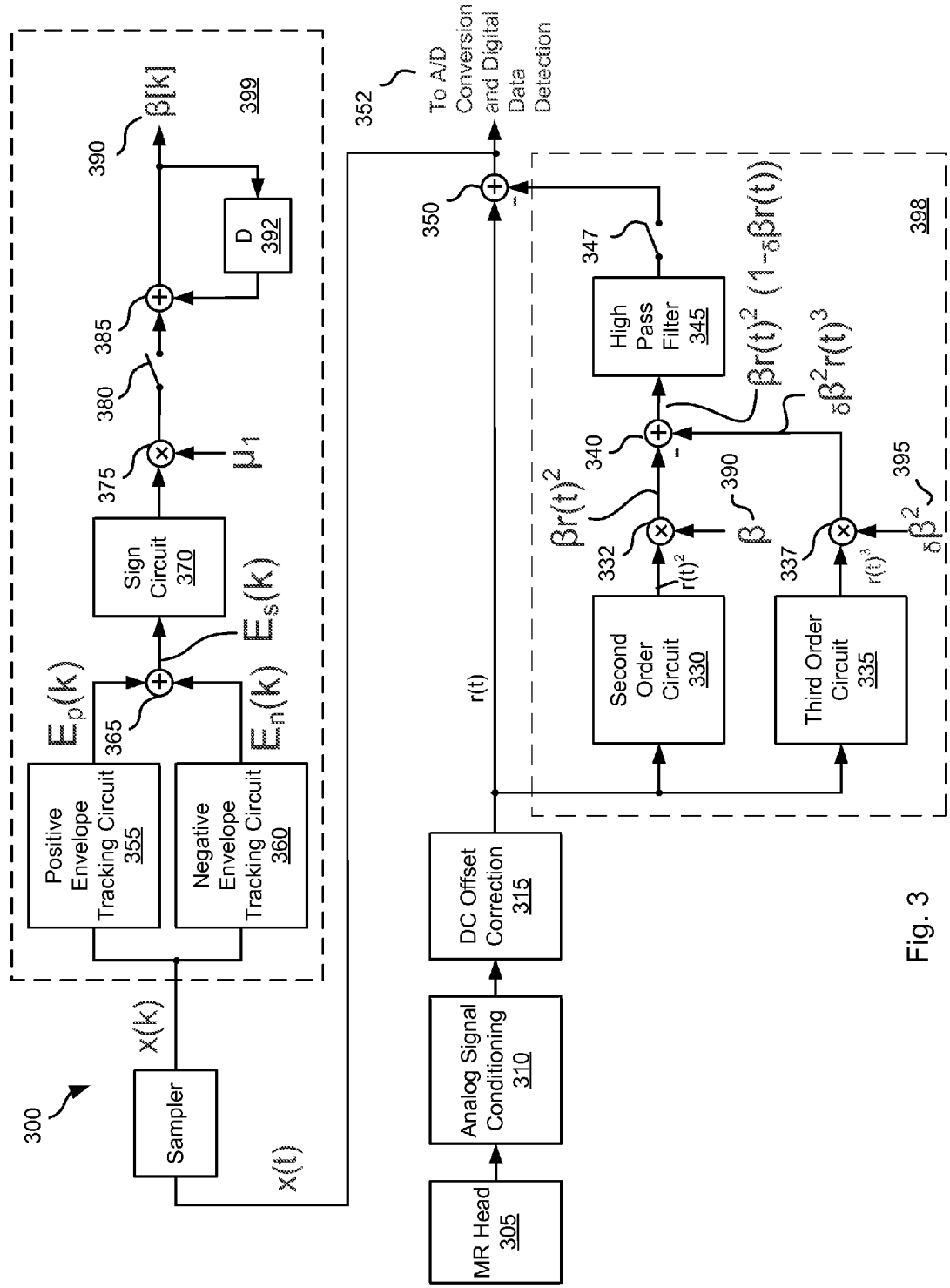
FIG. 3 depicts a data receiving circuit including front end distortion compensation in accordance with various embodiments of the present invention.

Turning to FIG. 3, a data receiving circuit 300 including front end distortion compensation is shown in accordance with various embodiments of the present invention. Data receiving circuit 300 includes a magnetoresistive read head 305 that is capable of sensing a magnetic field stored on a magnetic storage medium (not shown). Magnetoresistive head 305 provides an electrical output that varies in proportion to variations in the sensed magnetic field. The electrical output is provided to an analog signal conditioning circuit 310 that conditions the received signal for later processing. Analog signal conditioning circuit 310 may include any analog conditioning circuitry known in the art. For example, such a circuit may include some level of pre-amplification and filtering as are common in read channel devices. The conditioned signal is provided to a DC offset correction circuit 315. DC offset correction circuit 315 removes any DC offset exhibited by the conditioned signal. DC offset correction circuit 315 may be any circuit capable of removing a DC or very low frequency offset from an analog signal. Based upon the disclosure provided herein, one of ordinary skill in the art will recognize a variety of circuits that may be used in accordance with different embodiments of the present invention.

The offset adjusted output (r(t)) from DC offset correction circuit 315 is provided in parallel to a summation circuit 350 and to a distortion reduction circuit 398 (shown in dashed lines) that includes an analog second order circuit 330 and an analog third order circuit 335. Analog second order circuit 330 squares the offset adjusted output (i.e., provides a second order output), and analog third order circuit 335 cubes the offset adjusted output (i.e., provides a third order output) in accordance with the following equations:

$$\text{Second order} = r^2(t); \text{ and}$$

$$\text{Third order} = r^3(t).$$

The second order output from analog second order circuit 330 is multiplied by a distortion compensation factor 390 ($\beta$) using a multiplier circuit 332. The third order output from analog third order function circuit 335 is multiplied by distortion compensation factor 390 squared ($\beta^2$) and a scaling factor $\delta$ using a multiplier circuit 337 (shown as element 395). Use of such a third order circuit 335 allows for removing the third-order components introduced by the second-order circuit 330. The third order circuit 335 also allows for handling magnetoresistive read heads exhibiting a higher degree of asymmetry (i.e., non-linear distortion) in the compensation path. The scaling factor ($\delta$) may be chosen to be a fraction of the square of the scale-factor used for the second order term. Such a value is intuitively appealing since the effect of the third order term is expected to be significant only when the symmetry due to the magnetoresistive read head is high. The results of both of the aforementioned multiplications are subtracted using a summation circuit 340. The following equation corresponds to the output from summation circuit 340:

$$\text{Output of Summation Element } 340 = \beta r^2(t)[1 - \delta \beta r(t)].$$

The output of summation element 340 is passed through a high pass filter circuit 345. This filtered output corresponds to the distortion from magnetoresistive read head 305. The use of high pass filter 345 limits the possibility of reintroduction of DC-content into the read-signal. The inclusion of high pass filter 345 may be particularly useful in AC-coupled (ACC) perpendicular recording channels where baseline wander is a real problem. In contrast, high pass filter 345 is not necessary in DC-coupled (DCC) channels.

Where it is determined that the filtered response from high pass filter circuit 345 is not representative of the distortion from magnetoresistive head 305, a switch 347 may be opened to avoid modifying distortion compensation factor 390 based on the unrepresentative signal. As an example, where long patterns of logic 1's or logic 0's are received, a significant portion of distortion in the received signal may be due to baseline wander rather than magnetoresistive read head 305. Accordingly during such periods it may not be helpful to attempt compensation for distortion in magnetoresistive read heard 305. In some embodiments where patterns are detected that are likely to have significant pattern based distortion, switch 347 is opened causing the output of high pass filter 345 to be ignored, thereby minimizing the aggravation in baseline wander.

Where switch 347 is closed, the output of high pass filter 345 is subtracted from the original offset adjusted output (r(t)) to yield a compensated analog output 352 (x(t)) according to the following equation:

$$\text{Compensated Analog Output } 352 = r(t)[1 - \beta r(t)[1 - \delta \beta r(t)]].$$

Compensated analog output 352 is provided to a downstream data processing circuit (not shown) that includes, among other things, an analog to digital converter and data detector. In addition, compensated analog output 352 is provided to an adaptive distortion compensation calculation circuit 399 (shown in dashed lines). A sampling circuit 348 shown at the input of the adaptive distortion compensation calculation circuit 399 is for the purpose of discussion and illustration only and is not actually included in the circuit, rather, compensated analog output 352 is provided directly to sampling circuit 348. Sampling circuit 348 is merely shown for discussion purposes as it allows for a more readily understood mathematical discussion of the operation of adaptive distortion compensation calculation circuit 399 using discrete-time equations. In actual practice, the present invention involves implementing the adaptive distortion compensation calculation circuit 399 in analog domain using a purely analog circuit and employing corresponding real time equations.

Adaptive distortion compensation calculation circuit 399 adaptively estimates distortion compensation factor 390. This is done by estimating the envelopes of the positive and negative samples in the input signal. The difference between these envelopes is a measure of the amount of asymmetry present in the input signal. This calculated envelope difference can be used to drive an adaptive loop to estimate distortion compensation factor 390. Of note, the approach provides a distortion compensation signal that does not rely on any back-end information (i.e., data output from a downstream detector). Because the positive and negative envelopes respond to changes in the gain in the input signal, the proposed adaptive algorithm can work properly even in the presence of gain variations in the input signal. Consequently, adaptive distortion compensation circuit 399 may be placed before any variable gain amplifier included in an overall data detection circuit. Further, a simple DC estimation block can be implemented based on the analog signal and used for DC compensation of the signal prior to the MRA compensation. By comparing the difference in the envelopes with a dynamic threshold computed based on the sum of the envelopes, the presence of patterns with long runs can be detected. Using this information, switch 347 may be opened or closed as discussed above.

Adaptive distortion compensation circuit 399 includes a positive envelope tracking circuit 355 and a negative envelope tracking circuit 360. Positive envelope tracking circuit 355 provides an output in accordance with the following equations:

$$E_p[k]=\mu_2 E_p[k-1]+(1-\mu_2)x[k], \text{ for } x[k] \geq 0; \text{ and}$$

$$E_p[k]=E_p[k-1], \text{ for } x[k]<0.$$

Here, x[k] denotes a sampled version of the continuous-time signal x(t), and k denotes the sampling instant. A sample circuit may be used to change the input x(t) from the continuous domain to a discrete sample domain, x[k]. Negative envelope tracking circuit 360 provides an output in accordance with the following equations:

$$E_n[k]=E_n[k-1], \text{ for } x[k] \geq 0; \text{ and}$$

$$E_n[k]=\mu_2 E_n[k-]+(1-\mu_2)x[k], \text{ for } x[k]<0.$$

The output ($E_p[k]$) from positive envelope tracking circuit 355 and the output ($E_n[k]$) from negative envelope tracking circuit 360 are added using a summation circuit 365 to provide an output ($E_s[k]$). A sign circuit 370 obtains the sign of $E_s[k]$. This sign value is multiplied by $\mu_1$ using a multiplier circuit 375. The product of the multiplication is passed via a switch 380 to a summation circuit 385. Summation circuit 385 adds the previous distortion compensation factor 390 passed via a delay element 392 to the product of multiplier circuit 375. Distortion compensation factor 390 is calculated in accordance with the following equation:

$$\beta[k+1]=\beta[k]+\mu_1 \text{sign}(E_p[k]+E_n[k]).$$

Switch 380 and switch 347 are opened whenever the magnitude of $E_s[k]$ exceeds a scaled moving threshold value in accordance with the following equation:

$$|E_s[k]|>\delta_2[|E_p[k]|+|E_n[k]|].$$

Based on the disclosures provided herein, one of ordinary skill in the art will recognize the use of simple analog circuit implementation for the envelope trackers and the updating of distortion compensation factor described above. In one particular embodiment of the present invention, the values for the various scalars are as follow:

$$\delta_2=\{0.6(ACC), 1.0(DCC)\};$$

$$\delta=\{0.5(ACC), 1.0(DCC)\};$$

$$\mu_1=0.00001; \text{ and}$$

$$\mu_2=0.99.$$

It should be noted that even though data receiving circuit 300 uses both second and third order terms in the correction path, the number of distortion compensation factors is only one. This facilitates easy optimization of the distortion compensation factor. As the adaptive algorithm does not rely on any information from a downstream data detector, the adaptive distortion compensation approach may be used even in systems that exhibit significant latency between the analog front-end and digital back-end. It should be noted that data receiving circuit 300 may be employed as a tool for characterizing the amount of asymmetry in the included magnetoresistive read head. The approach for compensation embodied in data receiving circuit 300 can work well even in the presence of gain and DC offset variations. Thus, it can be implemented before any variable gain amplifier or DC offset block. This may include, for example, incorporation in a pre-amplifier that is part of analog signal conditioning circuit 310.

Figure 4:
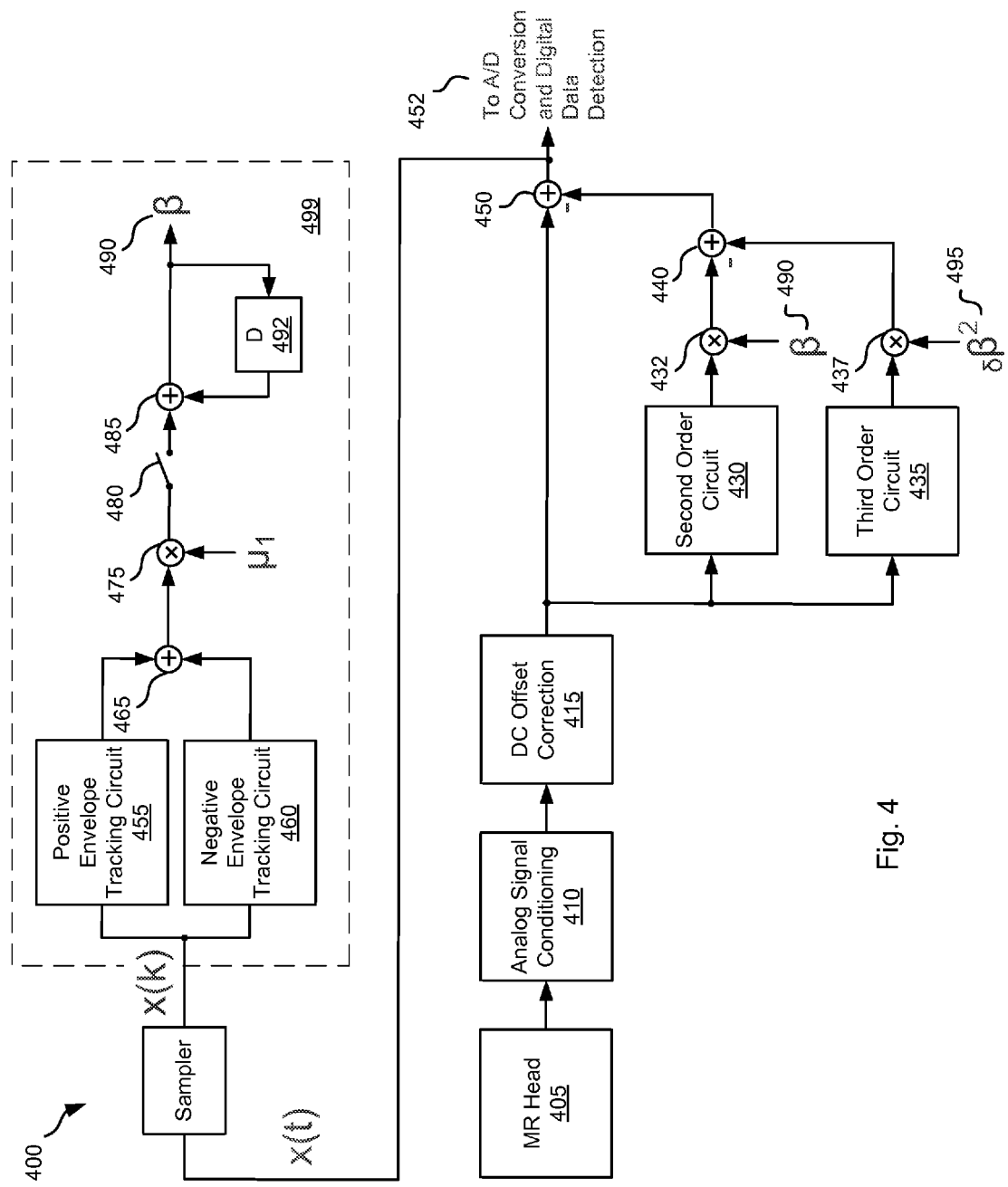
FIG. 4 depicts another data receiving circuit including front end distortion compensation in accordance with other embodiments of the present invention.

Turning to FIG. 4, a data receiving circuit 400 including front end distortion compensation is shown in accordance with various embodiments of the present invention. Data receiving circuit 400 includes a magnetoresistive read head 405 that is capable of sensing a magnetic field stored on a magnetic storage medium (not shown). Magnetoresistive head 405 provides an electrical output that varies in proportion to variations in the sensed magnetic field. The electrical output is provided to an analog signal conditioning circuit 410 that conditions the received signal for later processing. Analog signal conditioning circuit 410 may include any analog conditioning circuitry known in the art. For example, such a circuit may include some level of pre-amplification and filtering as are common in read channel devices. The conditioned signal is provided to a DC offset correction circuit 415. DC offset correction circuit 415 removes any DC offset exhibited by the conditioned signal. DC offset correction circuit 415 may be any circuit capable of removing a DC or very low frequency offset from an analog signal. Based upon the disclosure provided herein, one of ordinary skill in the art will recognize a variety of circuits that may be used in accordance with different embodiments of the present invention.

The offset adjusted output (r(t)) from DC offset correction circuit 415 is provided in parallel to a summation circuit 450 and to a distortion reduction circuit 498 (shown in dashed lines) that includes an analog second order circuit 430 and an analog third order circuit 435. Analog second order circuit 430 squares the offset adjusted output (i.e., provides a second order output), and analog third order circuit 435 cubes the offset adjusted output (i.e., provides a third order output) in accordance with the following equations:

$$\text{Second order}=r^2(t); \text{ and}$$

$$\text{Third order}=r^3(t).$$

The second order output from analog second order circuit 430 is multiplied by a distortion compensation factor 490 ($\beta$) using a multiplier circuit 432. The third order output from analog third order circuit 435 is multiplied by distortion compensation factor 490 squared ($\beta^2$) and a scaling factor $\delta$ using a multiplier circuit 437 (shown as element 495). The results of both of the aforementioned multiplications are subtracted using a summation circuit 440. The following equation corresponds to the output from summation circuit 340:

Output of Summation Element 440=$\beta r^2(t)[1-\delta\beta r(t)]$.

The output of summation element 440 is subtracted from the original offset adjusted output (r(t)) to yield a compensated analog output 452 (x(t)) according to the following equation:

Compensated Analog Output 452=$r(t)[1-\beta r(t)[1-\delta\beta r(t)]]$.

Compensated analog output 452 is provided to a downstream data processing circuit (not shown) that includes, among other things, an analog to digital converter and data detector. In addition, compensated analog output 452 is provided to an adaptive distortion compensation circuit 499 (shown in dashed lines). A sampling circuit 448 shown at the input of the adaptive distortion compensation calculation circuit 499 is for the purpose of discussion and illustration only and is not actually included in the circuit, rather, compensated analog output 452 is provided directly to sampling circuit 448. Sampling circuit 448 is merely shown for discussion purposes as it allows for a more readily understood mathematical discussion of the operation of adaptive distortion compensation calculation circuit 499 using discrete-time equations. In actual practice, the present invention involves implementing the adaptive distortion compensation calculation circuit 499 in analog domain using a purely analog circuit and employing corresponding real time equations.

Adaptive distortion compensation calculation circuit 499 includes a positive envelope tracking circuit 455 and a negative envelope tracking circuit 460. Positive envelope tracking circuit 455 provides an output in accordance with the following equations:

$E_p[k]=\mu_2 E_p[k-1]+(1-\mu_2)x[k]$, for $x[k]\geq 0$; and $E_p[k]=E_p[k-1]$, for $x[k]<0$.

Here, x[k] denotes a sampled version of the continuous-time signal x(t), and k denotes the sampling instant. A sample circuit may be used to change the input x(t) from the continuous domain to a discrete sample domain, x[k]. Negative envelope tracking circuit 460 provides an output in accordance with the following equations:

$E_n[k]=E_n[k-1]$, for $x[k]\geq 0$; and $E_n[k]=\mu_2 E_n[k-]+(1-\mu_2)x[k]$, for $x[k]<0$.

The output ($E_p[k]$) from positive envelope tracking circuit 455 and the output ($E_n[k]$) from negative envelope tracking circuit 460 are added using a summation circuit 465 to provide an output ($E_s[k]$). $E_s[k]$ is multiplied by $\mu_1$ using a multiplier circuit 475. The product of the multiplication is passed via a switch 480 to a summation circuit 485. Summation circuit 485 adds the previous distortion compensation factor 490 passed via a delay element 492 to the product of multiplier circuit 475. Distortion compensation factor 490 is calculated in accordance with the following equation:

$\beta[k+1]=\beta[k]+\mu_1 \text{sign}(E_p[k]+E_n[k])$.

Switch 480 is opened whenever the magnitude of $E_s[k]$ exceeds a scaled moving threshold value in accordance with the following equation:

$|E_s[k]|>\delta_2[|E_p[k]|+|E_n[k]|]$.

Based on the disclosure provided herein, one of ordinary skill in the art will recognize the use of simple analog circuit implementation for the envelope trackers and the updating of distortion compensation factor described above.

Figure 5:
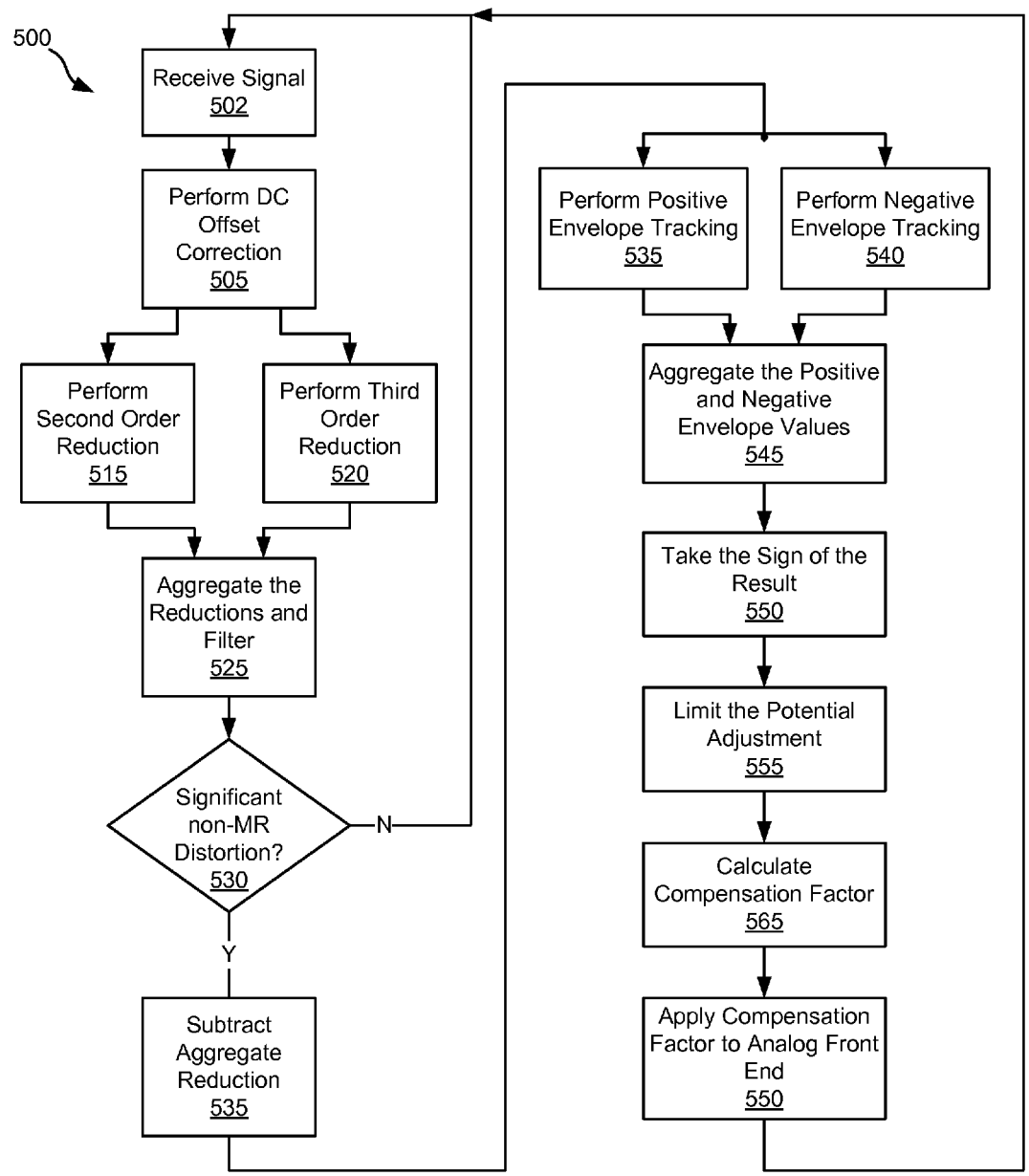
FIG. 5 is a flow diagram depicting a method in accordance with one or more embodiments of the present invention for performing front distortion compensation.

Turning to FIG. 5, a flow diagram 500 depicts a method in accordance with one or more embodiments of the present invention for performing front distortion compensation. Following flow diagram 500, a signal is received from a head and/or analog conditioning circuit (block 502). In some cases, the head may be a magnetoresistive read head. A DC offset correction is applied to the received input (block 505) to provide a DC offset corrected signal, r(t). This DC offset correction operates to remove any DC or very low frequency components included in the received signal. A second order reduction is performed (block 515) along with a third order reduction (block 520). The second order reduction involves squaring the DC offset corrected signal and multiplying the result by a previously calculated distortion compensation factor ($\beta$), and the third order reduction involves cubing the DC offset corrected signal multiplied by the square of the previously calculated distortion compensation factor ($\beta$) and a scaling factor ($\delta$). The resulting products are then aggregated and filtered (block 525). The aggregation includes subtracting the third order reduction from the second order product. The result is then high pass filtered to limit any low frequency components that may have been introduced. The result is defined by the following equation:

Reduction=$\beta r^2(t)[1-\delta\beta r(t)]$.

It is then determined whether there is a substantial amount of distortion from a source other than the head (block 530). Other distortion sources may include, but are not limited to, pattern based distortion occurring due to long runs of logic 1's or long runs of logic 0's. Where such long runs are detected, the previously described reduction is ignored. Alternatively, where there is not a substantial amount of distortion from a source other than the head (block 530), the reduction is subtracted from the original DC offset corrected signal (r(t)) to create a compensated analog output (x(t)) in accordance with the following equation (block 535):

$x(t)=r(t)[1-\beta r(t)[1-\delta\beta r(t)]]$.

Both a positive envelope tracking ($E_p$) and a negative envelope tracking ($E_n$) are performed on the compensated analog output in accordance with the following equations (blocks 535, 540):

$E_p[k]=\mu_2 E_p[k-1]+(1-\mu_2)x[k]$, for $x[k]\geq 0$;

$E_p[k]=E_p[k-1]$, for $x[k]<0$;

$E_n[k]=E_n[k-1]$, for $x[k]\geq 0$; and $E_n[k]=\mu_2 E_n[k-]+(1-\mu_2)x[k]$, for $x[k]<0$.

Here, x[k] denotes a sampled version of the continuous-time signal x(t), and k denotes the sampling instant. The results of the aforementioned positive envelope tracking and negative envelope tracking are aggregated to provide an output, $E_s[k]$, in accordance with the following equation (block 545):

$E_s[k]=E_p[k]+E_n[k]$.

The sign of the result is taken (block 550) and multiplied by a scalar ($\mu_1$) to limit the amount of adjustment to the distortion compensation factor on any iteration (block 555) in accordance with the following equation:

$$\text{Adjustment Value} = \mu_1 \, \text{sign}(E_p[k] + E_n[k]).$$

The resulting adjustment value is used to calculate an updated distortion compensation factor (block 565). The updated distortion compensation factor is iteratively calculated by adding the aforementioned adjustment value ($\mu_1 \, \text{sign}(E_p[k] + E_n[k])$) to the previous distortion compensation factor ($\beta[k]$) in accordance with the following equation:

$$\beta[k+1] = \beta[k] + \mu_1 \, \text{sign}(E_p[k] + E_n[k]).$$

The resulting updated distortion compensation factor is applied to performing the second order and third order functions that were described above in relation to blocks 515, 520.

Figure 6A:
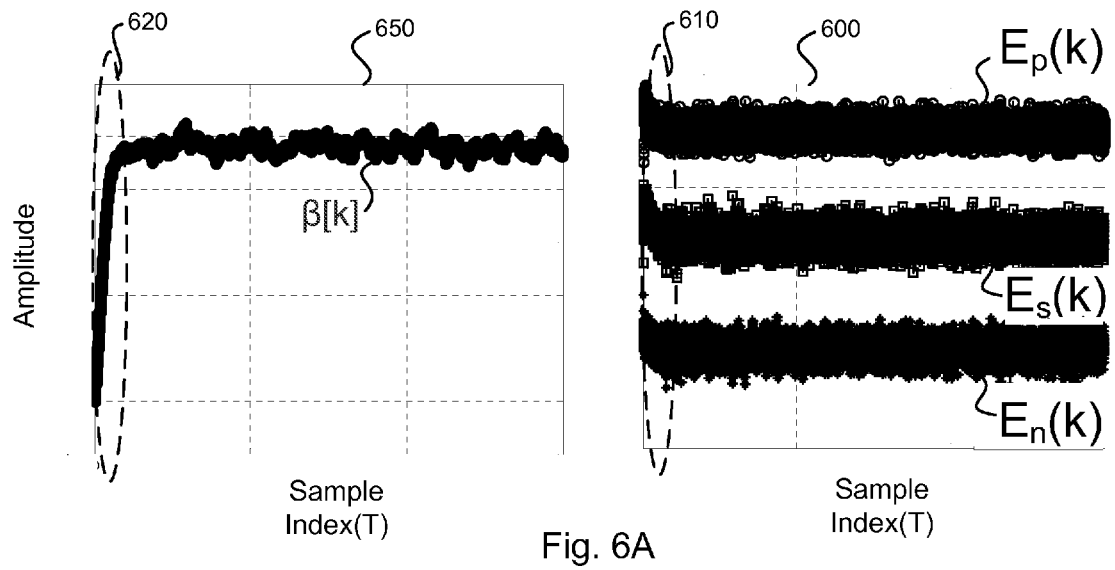
FIGS. 6A-6B are timing diagrams depicting exemplary operation of one or more embodiments of the present invention.

Turning to FIG. 6A, timing diagrams 600, 650 depict an exemplary operation of one or more embodiments of the present invention. Timing diagram 600 shows exemplary plots of $E_p[k]$ and $E_n[k]$, with a corresponding plot of $E_s[k]$. Timing diagram 650 shows an exemplary plot of a distortion compensation factor, $\beta$, that corresponds to the plots of timing diagram 600. An initial period 610 (outlined by dashed lines) corresponds to an initial period 620 (also outlined by dashed lines). As shown, during the initial periods, $E_p[k]$ and $E_n[k]$ are asymmetrically positive resulting in a skewed $E_s[k]$. To overcome the skew in $E_s[k]$, the value of the distortion compensation factor, $\beta$, is increased until the skew in $E_s[k]$ is eliminated. Once this happens, the distortion compensation factor becomes relatively stable.

Figure 6B:
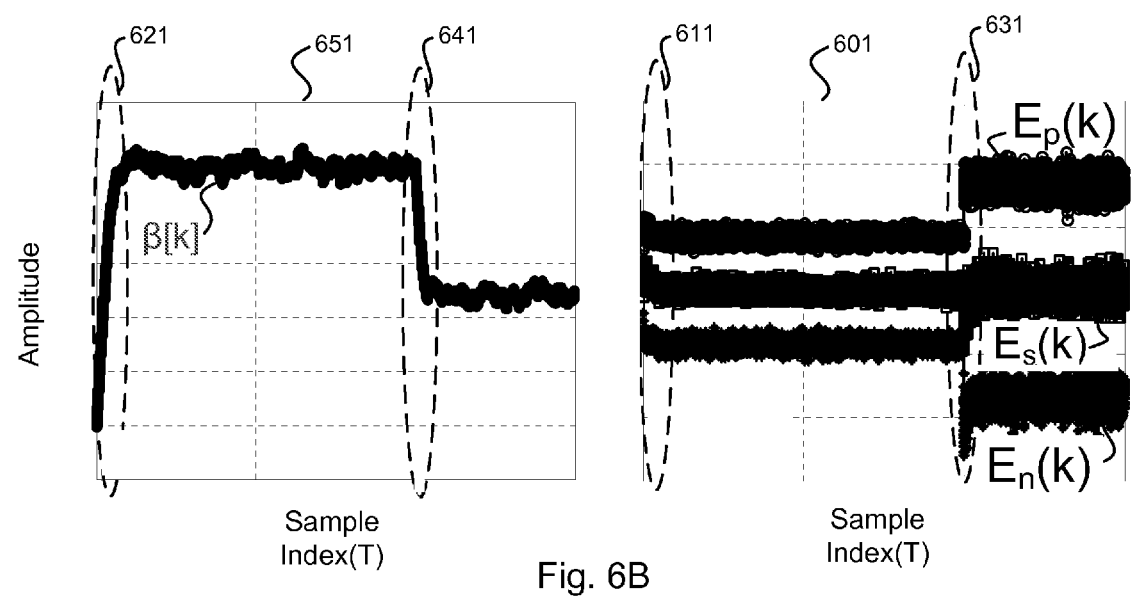

Turning to FIG. 6B, timing diagrams 601, 651 depict an exemplary operation of one or more embodiments of the present invention. Timing diagram 601 shows exemplary plots of $E_p[k]$ and $E_n[k]$, with a corresponding plot of $E_s[k]$. Timing diagram 651 shows an exemplary plot of a distortion compensation factor, $\beta$, that corresponds to the plots of timing diagram 601. An initial period 611 (outlined by dashed lines) corresponds to an initial period 621 (also outlined by dashed lines). As shown, during the initial periods, $E_p[k]$ and $E_n[k]$ are asymmetrically positive resulting in a skewed $E_s[k]$. To overcome the skew in $E_s[k]$, the value of the distortion compensation factor, $\beta$, is increased until the skew in $E_s[k]$ is eliminated. Once this happens, the distortion compensation factor becomes relatively stable.

Additionally, a transition period 631 (outlined by dashed lines) shows a time when the gain in input signal r(t) increases. A corresponding period 641 (also outlined by dashed lines) shows the change in the distortion compensation factor, $\beta$, corresponding to the change in the gain. As shown, various embodiments of the present invention are robust to changes in signal gain. This allows for performing the adaptive compensation either before or after any gain compensation in the circuit. A corresponding change results where the gain decreases.

Figure 7:
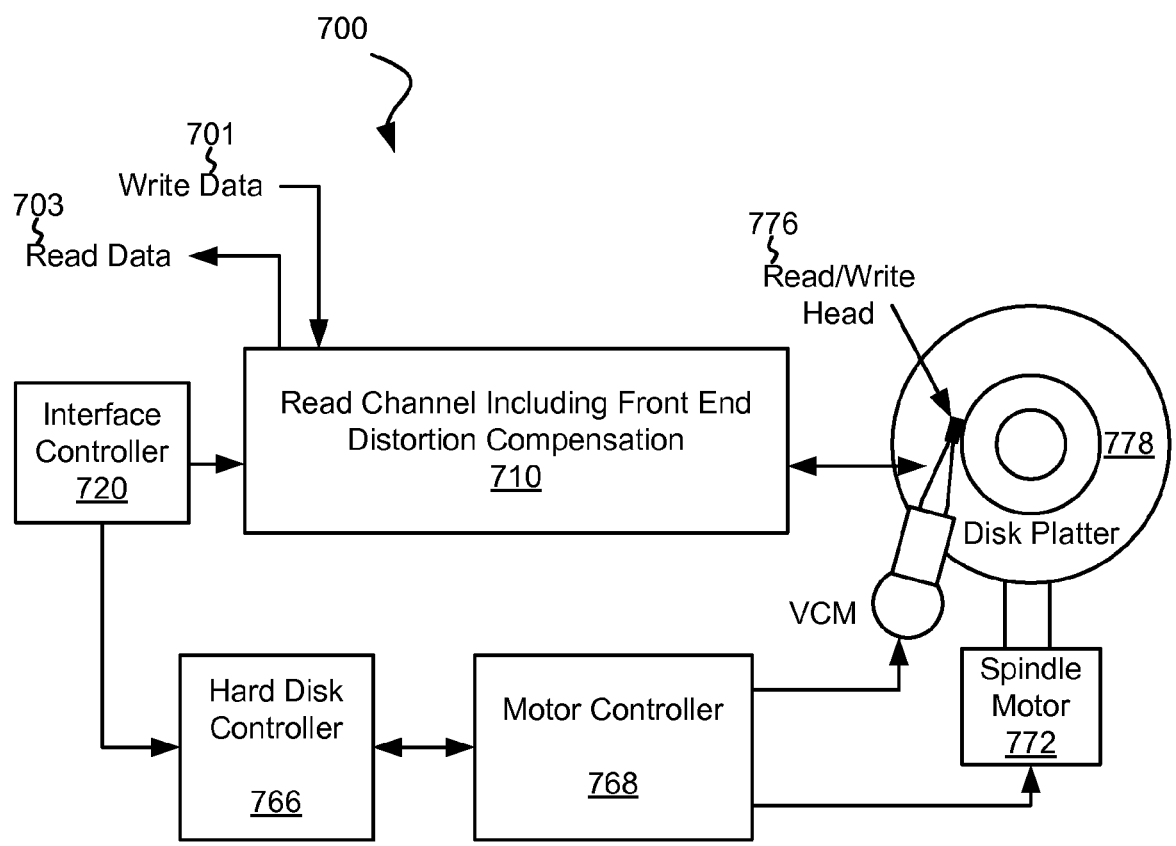
FIG. 7 shows a storage system including a read channel circuit including front end distortion compensation in accordance with various embodiments of the present invention.

FIG. 7 shows a storage system 700 including a read channel circuit 710 including front end distortion compensation in accordance with one or more embodiments of the present invention. Storage system 700 may be, for example, a hard disk drive. The incorporated front end distortion compensation is capable of selectively compensating for any distortion exhibited by a read head. The read head is included in a read/write head assembly 776. In some embodiments of the present invention, the read head is a magnetoresistive read head. The distortion compensation circuit may include components similar to those described above in relation to FIG. 3 and FIG. 4 above, and may operate similar to that described in relation to FIGS. 3-5 above. In addition, storage system 700 includes an interface controller 720, a hard disk controller 766, a motor controller 768, a spindle motor 772, a disk platter 778, and read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs).

Once read/write head assembly 776 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel module 710. Read channel module 710 may constantly perform or periodically perform an adaptive compensation algorithm designed to compensate for any distortion introduced by read/write head assembly 776. In turn, read channel module 710 decodes and digitizes the received analog signal to recreate the information originally written to disk platter 778. This data is provided as read data 703 to a receiving circuit. A write operation is substantially the opposite of the preceding read operation with write data 701 being provided to read channel module 710. This data is then encoded and written to disk platter 778.

In conclusion, the invention provides novel systems, devices, methods and arrangements for limiting the effects of non-linear distortion in a data receiving circuit. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A distortion compensation circuit, the circuit comprising:
    an input analog signal;
    a previous distortion compensation factor;
    a distortion reduction circuit providing a compensated analog output, wherein the distortion reduction circuit is operable to reduce distortion in the input analog signal based upon a second order function of the input analog signal, a third order function of the input analog signal, and the previous distortion compensation factor; and
    a distortion compensation calculation circuit, wherein the distortion compensation calculation circuit is operable to calculate an updated distortion compensation factor based at least in part on the previous distortion compensation factor and the compensated analog output.

2. The circuit of claim 1, wherein the second order circuit squares the input analog signal and provides a second order output, and wherein the third order circuit cubes the input analog sign and provides a third order output.

3. The circuit of claim 2, wherein the distortion reduction circuit includes:
    a first multiplication circuit, wherein the first multiplication circuit provides a first product, and wherein the first product is a multiplication of the second order output by the previous distortion compensation factor; and
a second multiplication circuit, wherein the second multiplication circuit provides a second product, and wherein the second product is a multiplication of the third order output by a square of the previous distortion compensation factor and a first scalar.

4. The circuit of claim 3, wherein the distortion reduction circuit further includes:
a first aggregation circuit providing a first aggregate output, wherein the first aggregate output is the first product less the second product;
a high pass filter, wherein the high pass filter filters the first aggregate output to provide a filtered output; and
a switch disposed between the first aggregation circuit and a second aggregation circuit, where the second aggregation circuit provides the compensated analog output, and wherein the compensated analog output is the analog signal less the filter output when the switch is closed and the analog signal when the switch is open.

5. The circuit of claim 1, wherein the distortion compensation circuit includes:
a positive envelope tracking circuit receiving the compensated analog output and calculating a positive envelope;
a negative envelope tracking circuit receiving the compensated analog output and calculating a negative envelope; and
an aggregation circuit, wherein the aggregation circuit provides an aggregate output, and wherein the aggregate output is the sum of the positive envelope and the negative envelope; and a distortion compensation calculation circuit, wherein the distortion compensation calculation circuit provides the updated distortion compensation factor, and wherein the updated distortion compensation factor is the previous distortion compensation factor plus a derivative of the aggregate output.

6. The circuit of claim 5, wherein the distortion compensation circuit further includes:
a sign circuit, wherein the sign circuit provides a sign of the aggregate output; and
a third multiplication circuit, wherein the third multiplication circuit provides a third product, wherein the third product is a multiplication of the sign of the third aggregate output by a scalar, and wherein the derivative of the aggregate output is the third product.

7. The circuit of claim 5, wherein the derivative of the aggregate output is selected from a group consisting of: the aggregate output, and the product of the aggregate output and a scalar.

8. A distortion compensation circuit, the circuit comprising:
an analog signal;
a second order circuit, wherein the second order circuit is operable to square the analog signal and provides a second order output;
a third order circuit, wherein the third order circuit is operable to cube the analog signal and provides a third order output;
a first multiplication circuit, wherein the first multiplication circuit is operable to provide a first product, and wherein the first product is a multiplication of the second order output by a previous distortion compensation factor;
a second multiplication circuit, wherein the second multiplication circuit is operable to provide a second product, and wherein the second product is a multiplication of the third order output by a square of the previous distortion compensation factor and a first scalar;
a first aggregation circuit operable to provide a first aggregate output, wherein the first aggregate output is the first product less the second product;
a second aggregation circuit operable to provide a second aggregate output, wherein the second aggregate output is based upon a combination of the analog signal and the first aggregate output;
a positive envelope tracking circuit operable to receive the second aggregate output and calculating a positive envelope;
a negative envelope tracking circuit operable to receive the second aggregate output and calculating a negative envelope;
a third aggregation circuit, wherein the third aggregation circuit is operable to provide a third aggregate output, and wherein the third aggregate output is the sum of the positive envelope and the negative envelope;
a distortion compensation calculation circuit, wherein the distortion compensation calculation circuit is operable to provide an updated distortion compensation factor, and wherein the updated distortion compensation factor is the previous distortion compensation factor plus a derivative of the third aggregate output.

9. The circuit of claim 8, wherein the analog signal is derived from a magnetic storage medium using a read head.

10. The circuit of claim 9, wherein the read head is a magnetoresistive read head that introduces some non-linear distortion.

11. The circuit of claim 8, wherein the circuit further comprises:
a high pass filter, wherein the high pass filter filters the first aggregate output to provide a filtered output; and
a switch disposed between the first aggregation circuit and the second aggregation circuit, wherein the second aggregate output is the analog signal less the filter output when the switch is closed and the analog signal when the switch is open.

12. The circuit of claim 8, wherein the circuit further comprises:
a sign circuit, wherein the sign circuit provides a sign of the third aggregate output, and a third multiplication circuit, wherein the third multiplication circuit provides a third product, wherein the third product is a multiplication of the sign of the third aggregate output by a second scalar, and wherein the derivative of the third aggregate output is the third product.

13. The circuit of claim 8, wherein the derivative of the third aggregate output is selected from a group consisting of: the third aggregate output, and the product of the third aggregate output multiplied by a second scalar.

14. The circuit of claim 8, wherein the distortion compensation calculation circuit receives the derivative of the third aggregate output via a switch, and wherein the switch is operable to limit modification of the previous distortion compensation factor when the derivative of the third aggregate output is out of range.

15. The circuit of claim 14, wherein the range is a variable range based upon the positive envelope and the negative envelope.

16. A storage device, the storage device comprising:
a storage medium, wherein the storage medium includes information;

a read/write head assembly disposed in relation to the storage medium and operable to provide an input analog signal corresponding to the information;

an adaptive distortion modification circuit, wherein the adaptive distortion modification circuit is operable to receive the input analog signal and adaptively estimate an updated distortion compensation factor, and wherein the adaptive distortion modification circuit includes:

a previous distortion compensation factor;

a distortion reduction circuit providing a compensated analog output, wherein the distortion reduction circuit is operable to reduce distortion in the input analog signal based upon a second order function of the input analog signal, a third order function of the input analog signal, and the previous distortion compensation factor; and a distortion compensation calculation circuit, wherein the distortion compensation calculation circuit is operable to calculate an updated distortion compensation factor based at least in part on the previous distortion compensation factor and the compensated analog output.

17. The device of claim 16, wherein the read/write head assembly includes a magneto resistive head, and wherein the distortion compensation factor is designed to compensate for non-linear distortion introduced by the magneto resistive head.

18. The device of claim 16, wherein the second order circuit is operable to square the input analog signal and provides a second order output, wherein the third order circuit is operable to cube the input analog signal and provides a third order output, and wherein the distortion reduction circuit further includes:

a first multiplication circuit, wherein the first multiplication circuit is operable to provide a first product, and wherein the first product is a multiplication of the second order output by the previous distortion compensation factor;

a second multiplication circuit, wherein the second multiplication circuit is operable to provide a second product, and wherein the second product is a multiplication of the third order output by a square of the previous distortion compensation factor and a scalar;

an aggregation circuit operable to provide an aggregate output, wherein the aggregate output is the first product less the second product;

a high pass filter, wherein the high pass filter is operable to filter the first aggregate output to provide a filtered output; and a switch disposed between the first aggregation circuit and a second aggregation circuit, wherein the second aggregation circuit is operable to provide the compensated analog output, and wherein the compensated analog output is the analog signal less the filtered output when the switch is closed and the analog signal when the switch is open.

19. The device of claim 16, wherein the distortion compensation circuit includes:

a positive envelope tracking circuit operable to receive the compensated analog output and calculating a positive envelope;

a negative envelope tracking circuit operable to receive the compensated analog output and calculating a negative envelope; and an aggregation circuit, wherein the aggregation circuit is operable to provide an aggregate output, and wherein the aggregate output is the sum of the positive envelope and the negative envelope; and a distortion compensation calculation circuit, wherein the distortion compensation calculation circuit is operable to provide the updated distortion compensation factor, and wherein the updated distortion compensation factor is the previous distortion compensation factor plus a derivative of the aggregate output.

* * * * *